Patented Mar. 27, 1945

2,372,221

UNITED STATES PATENT OFFICE 2,372,221

PROCESS OF ACETYLATING 2,3-BUTYLENE GLYCOL WITH THE IMPURE ACETIC ACID OBTAINED FROM THE PYROLYTIC DECOMPOSITION OF 2,3-BUTYLENE GLYCOL DIACETATE TO BUTADIENE

Samuel A. Morell, Peoria, Ill., assignor to the United States of America as represented by Claude R. Wickard, Secretary of Agriculture, and his successors in office No Drawing. Application September 14, 1943, Serial No. 502,318

4 Claims. (Cl. 260—488)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a new method for acetylating 2,3-butylene glycol with the impure acetic acid obtained from the pyrolytic decomposition of 2,3-butylene glycol diacetate to butadiene.

In the production of 1,3-butadiene from 2,3-butylene glycol diacetate (Hill and Isaacs, U. S. Patent No. 2,224,912), the acetic acid recovered from the pyrolysis reaction is reutilized for making a further quantity of diacetate. This is accomplished by heating a mixture of the recovered acetic acid, 2,3-butylene glycol, a little sulfuric acid, and benzene. The water formed in the esterification boils off with the benzene. In this manner, the two processes, pyrolysis and esterification, are carried out in combination so that a continuous process is developed.

In conducting this process, I have discovered that certain side reactions invariably occur during the pyrolysis, the products of which seriously interfere with the reuse of the recovered acetic acid. These side-reaction products form azeotropic systems with water and acetic acid and, hence, interfere with the benzene-water entraining system used in the esterification. Examples of such side-reaction products which I have discovered are: (1) methyl ethyl ketone, (2) mixtures of low-boiling hydrocarbons, (3) 2-butene-2-ol acetate (one of several monoacetate intermediates in the decomposition of diacetate to butadiene) which is partially converted to methyl ethyl ketone during the esterification. In the presence of these side-reaction products, large amounts of acetic acid are continuously removed from the esterification reaction and appear in the water being separated. The constant accumulation of these side-reaction products during successive pyrolysis and esterification eventually reaches a point where acetic acid losses become so excessive that the separator ceases to function.

It is the object of the present invention to remedy these disadvantages and to develop a new method for using the recovered acetic acid in the esterification.

The side-reaction products themselves serve as good entraining agents for the water formed during the esterification and they may accordingly be used for this purpose. However, they also entrain acetic acid, so that it is necessary to use an auxiliary entraining agent to avoid this result. Of the various side-reaction products formed during the pyrolysis of 2,3-butylene glycol diacetate, I have found that the one which exhibits the lowest constant boiling mixture with water, approximately 73.4° C., is methyl ethyl ketone. The auxiliary entraining agent, therefore, must fulfill both of the following requirements: (1) It must not form a constant-boiling mixture with acetic acid, and (2) it must form a constant-boiling mixture with water which is lower than 73.4° C. Benzene forms a constant-boiling mixture with acetic acid and, hence, does not fulfill these requirements. Compounds which may be used, however, are low boiling ethers, including the light petroleum ethers boiling up to approximately 75° C., halogenated hydrocarbons, and esters, examples of which are isopropyl ether, n-propyl ether, dichlormethane, ethyl acetate, methyl acetate, and so forth. The quantity of the auxiliary entraining agent required is very small, being only the amount necessary to maintain a concentration in the column above the esterification vessel such that the azeotrope with water is always present. As the azeotrope is removed, the entrainer can be separated and returned to the column. A very convenient auxiliary entraining agent to use is isopropyl ether, which forms a constant-boiling mixture with water, b. p. 62.2° C., and is, hence, easily separated from the methyl ethyl ketone-water constant-boiling mixture.

After esterification is completed, the isopropyl ether is quantitatively recovered by distillation and reused. The methyl ethyl ketone is then distilled, followed by the low boiling hydrocarbon mixtures. In this manner, the volatile by-products of the process are removed.

This new process for esterifying 2,3-butylene glycol with the impure acetic acid recovered from the pyrolysis of its diacetate makes it possible to operate the process for producing butadiene more economically, since (1) it uses the side-reaction pyrolysis products naturally present to remove water formed during esterification, (2) it permits the continuous removal from the process of low-boiling side-reaction pyrolysis by-products and, hence, prevents their accumulation, and (3) it requires only a relatively small amount of an auxiliary entraining agent.

The following examples illustrate but do not limit the invention:

Example 1

Nine hundred and one parts by weight of 2,3-butylene glycol were mixed with 125 parts of isopropyl ether, 16 parts of 98 percent sulfuric acid, and 2182 parts of the impure acetic acid obtained from the pyrolysis of 2,3-butylene glycol diacetate. The impure acetic acid contained 68.7 percent acetic acid, 19.3 percent intermediate monoacetates (mixtures of isomeric butene-ol acetates), and 8.0 percent diacetate. This mixture was boiled in an apparatus in which the water formed during esterification distilled with the isopropyl ether, from which it was continuously separated and the isopropyl ether returned to the esterification mixture. Boiling was continued until no more water distilled. The isopropyl ether was then distilled off and recovered quantitatively for reuse. Distillation was continued up to 112° C., thus removing methyl ethyl ketone and various mixtures of low boiling hydrocarbons (both being side-reaction by-products of the pyrolysis). The esterification mixture, after removing the sulfuric acid catalyst, was then without further treatment, pyrolyzed to butadiene.

Example 2

Nine hundred and one parts by weight of 2,3-butylene glycol were mixed with 125 parts of isopropyl ether, 16 parts of 98 percent sulfuric acid, and 1625 parts of the impure acetic acid obtained from the pyrolysis of 2,3-butylene glycol diacetate. The impure acetic acid contained 92.4 percent acetic acid, 2.5 percent intermediate monoacetates (mixtures of isomeric butene-ol acetates), and 1.2 percent diacetate. The mixture was boiled exactly as described in Example 1 until no more water distilled. The isopropyl ether was then distilled off and recovered quantitatively for reuse. Distillation was continued up to 112° C., thus removing methyl ethyl ketone and various mixtures of low boiling hydrocarbons. The esterification mixture, after removing the sulfuric acid catalyst, was then distilled, the acetic acid in the mixture being first removed and then the pure diacetate. The yield was over 97 percent of the theoretical.

Having thus described my invention, I claim:

1. The process of forming 2,3-butylene glycol diacetate which comprises acetylating 2,3-butylene glycol with the impure acetic acid obtained from the pyrolytic decomposition of 2,3-butylene glycol diacetate to butadiene, in the presence of an entraining agent comprising a low boiling ether characterized by the fact that it will not form an azeotrope with acetic acid but will form an azeotrope with water, the boiling point of which is less than 73.4° C.

2. In the process of acetylating 2,3-butylene glycol with the impure acetic acid obtained from the pyrolytic decomposition of 2,3-butylene glycol diacetate to butadiene, the step which comprises continuously removing the water formed during the acetylation by distillation in the presence of an entraining agent comprising a low boiling ether characterized by the fact that it will not form an azeotrope with acetic acid but will form an azeotrope with water, the boiling point of which is less than 73.4° C.

3. In the process of acetylating 2,3-butylene glycol with the impure acetic acid obtained from the pyrolytic decomposition of 2,3-butylene glycol diacetate to butylene, the step which comprises continuously removing the water formed during the acetylation by distillation in the presence of an entraining agent of the type corresponding to the formula:

$$R-O-R'$$

in which R is a member of the class consisting of alkyl radicals containing not more than 3 carbon atoms and acyl radicals containing not more than 4 carbon atoms, and R' is an alkyl radical containing not more than 3 carbon atoms.

4. In the process of acetylating 2,3-butylene glycol with the impure acetic acid obtained from the pyrolytic decomposition of 2,3-butylene glycol diacetate to butadiene, the step which comprises continuously removing the water formed during the acetylation by distillation in the presence of isopropyl ether.

SAMUEL A. MORELL.